United States Patent
Weiss

[11] Patent Number: 5,279,728
[45] Date of Patent: Jan. 18, 1994

[54] SWIMMING POOL SKIMMER APPARATUS

[76] Inventor: Paul A. Weiss, 1677 Speedway, Wichita Falls, Tex. 76301

[21] Appl. No.: 51,772

[22] Filed: Apr. 26, 1993

[51] Int. Cl.⁵ .............................................. B01D 35/05
[52] U.S. Cl. .................................. 210/169; 210/242.1; 210/416.2; 210/418; 4/490
[58] Field of Search ............. 251/305; 210/169, 242.3, 210/242.1, 416.2, 418, 419, 923; 4/490; 15/1.7

[56] References Cited

U.S. PATENT DOCUMENTS

| | | | |
|---|---|---|---|
| 2,989,185 | 6/1961 | Lombardi | 210/169 |
| 3,856,679 | 12/1974 | Jackson | 210/169 |
| 4,040,864 | 8/1977 | Steeves | 210/169 |
| 4,089,074 | 5/1978 | Sermons | 4/490 |
| 4,305,830 | 12/1981 | Shimura | 210/242.3 |
| 4,518,495 | 5/1985 | Harding | 210/169 |
| 4,606,819 | 8/1986 | Colson | 210/169 |
| 4,746,424 | 5/1988 | Drew | 210/169 |
| 4,815,693 | 3/1989 | James et al. | 251/305 |
| 4,889,622 | 12/1989 | Newcombe-Bond | 210/169 |
| 5,043,060 | 8/1991 | Brennan | 210/169 |

*Primary Examiner*—Stanley S. Silverman
*Assistant Examiner*—Robert James Popovics
*Attorney, Agent, or Firm*—Leon Gilden

[57] ABSTRACT

An apparatus including valving structure to direct in a circular swimming pool a first conduit to effect a circular stream within the swimming pool, with a second conduit directed to a basket, and the second conduit having a nozzle directing fluid flow into the basket in association with the first conduit to direct debris from the swimming pool into the basket structure.

3 Claims, 4 Drawing Sheets

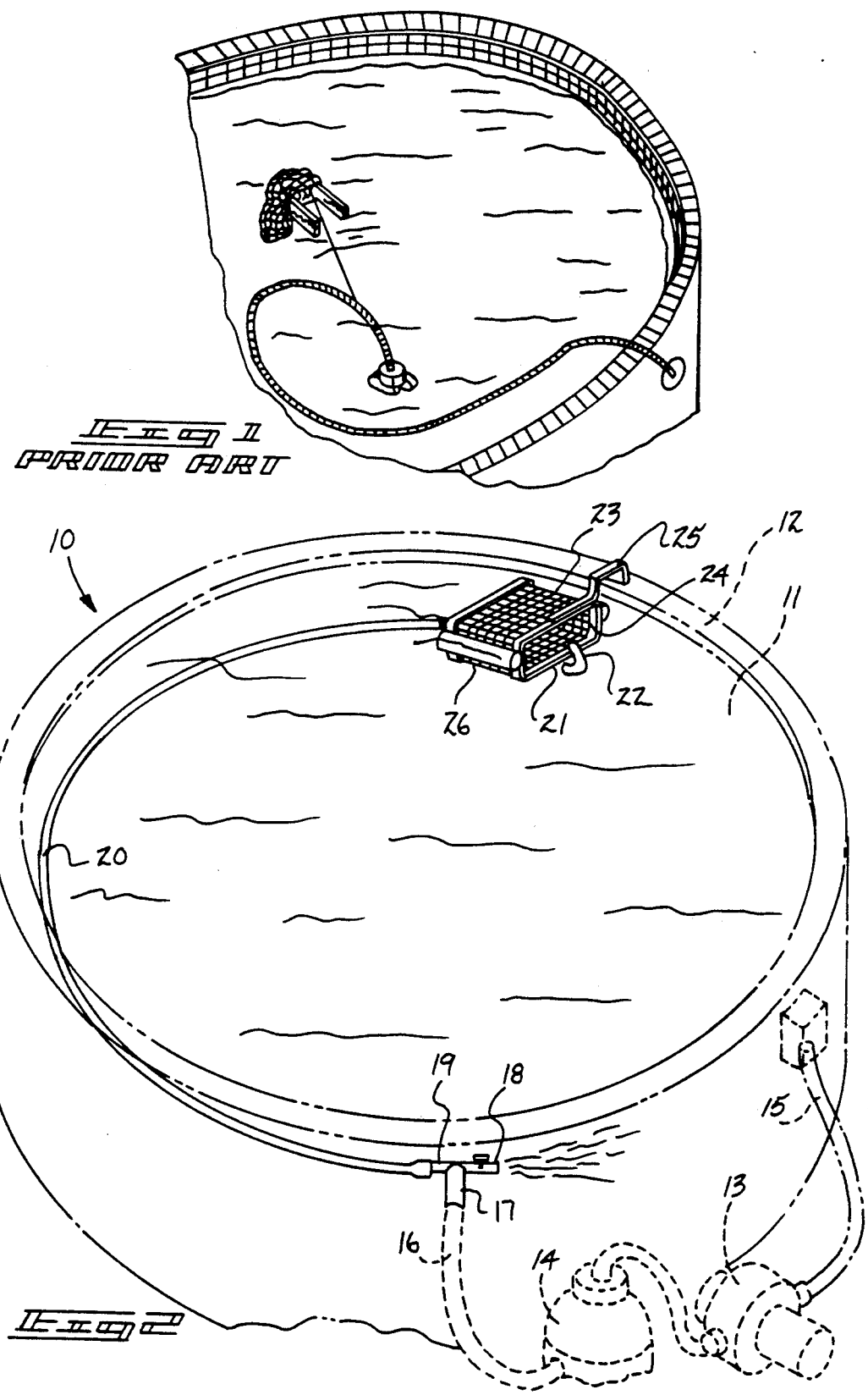

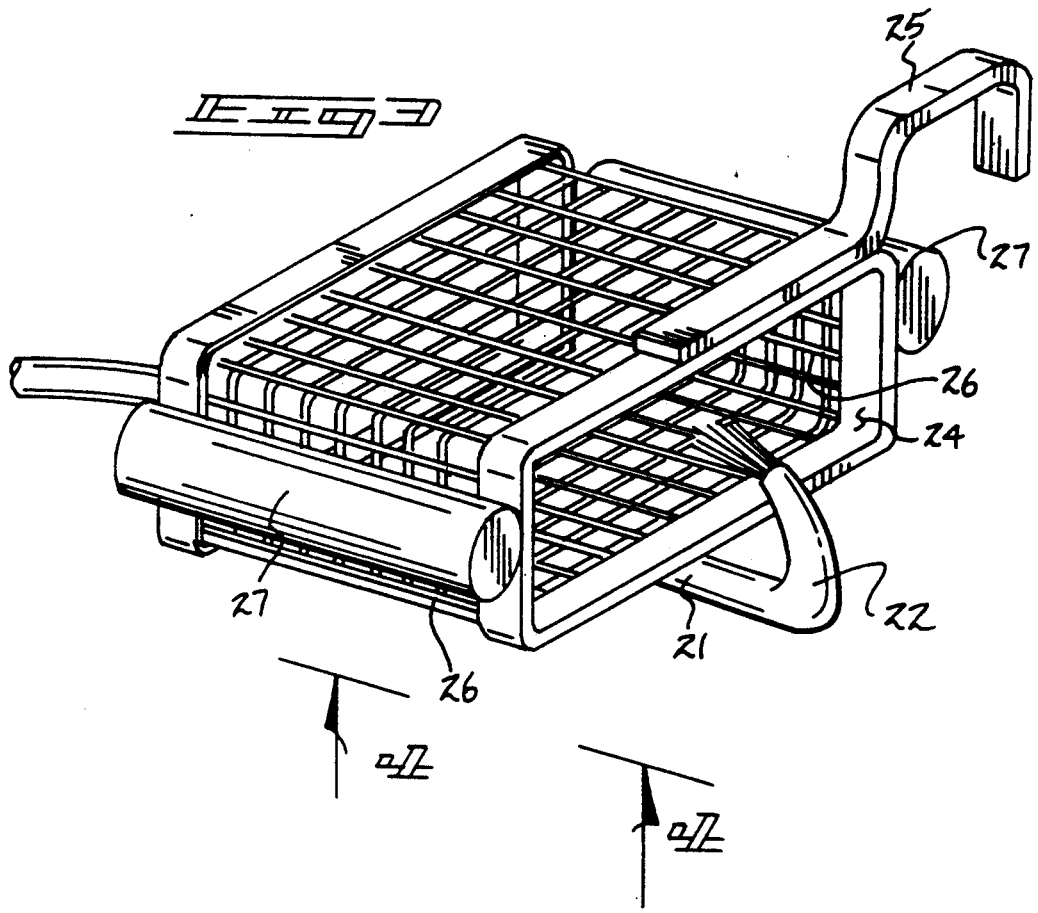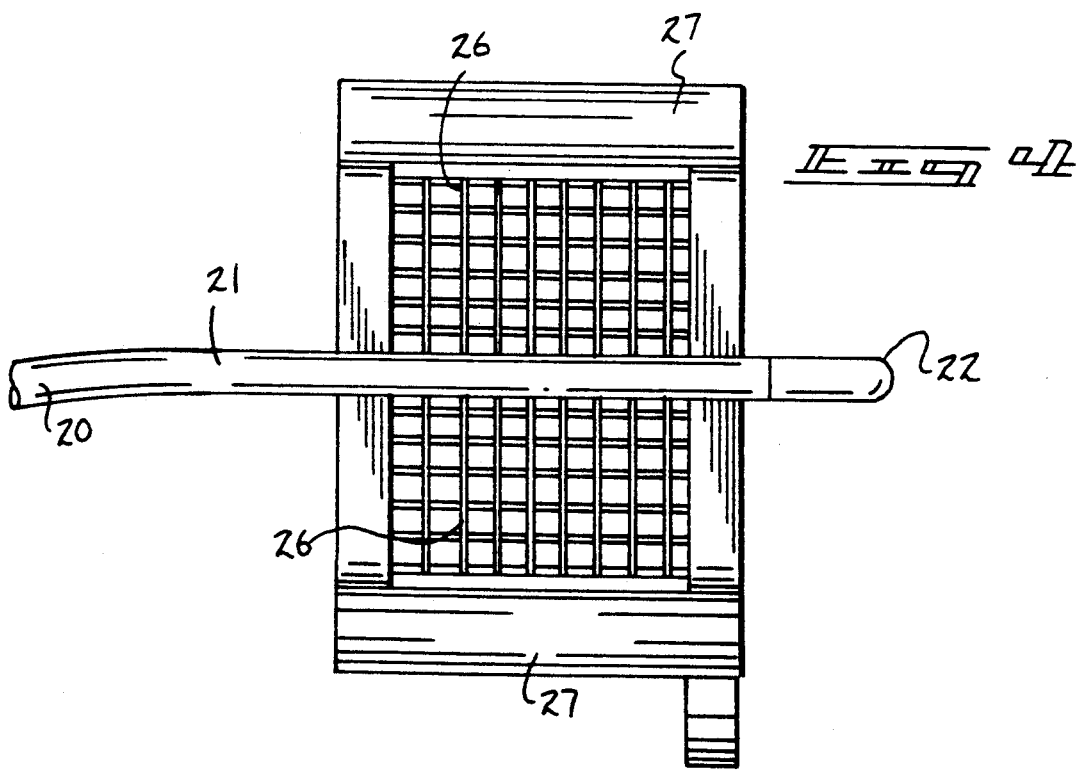

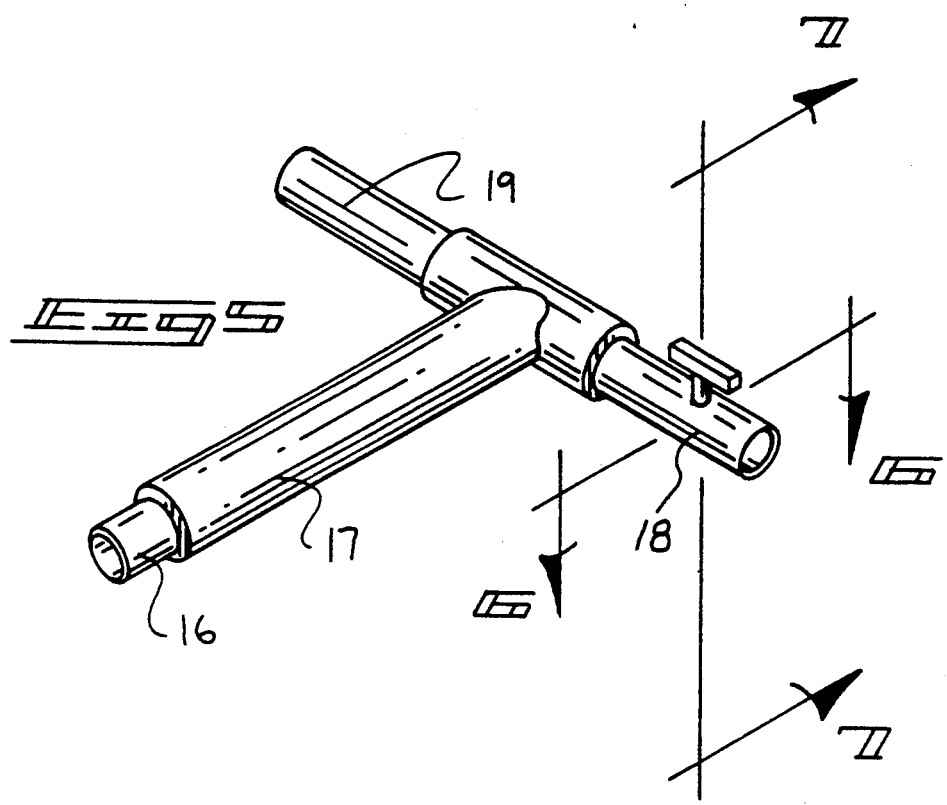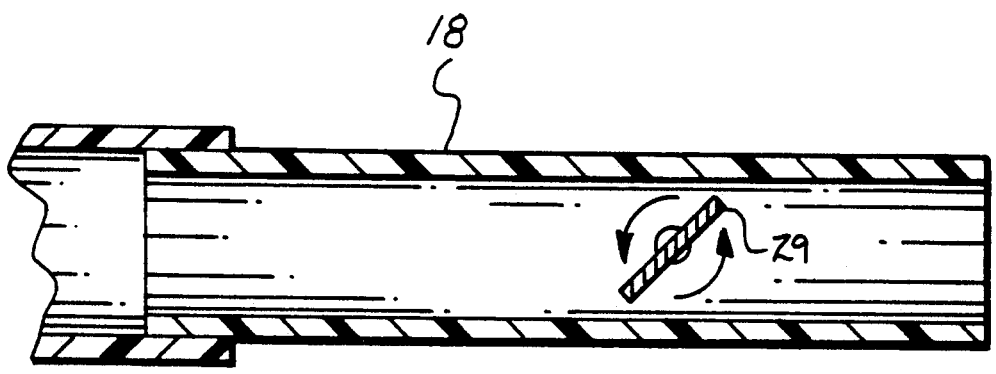

SWIMMING POOL SKIMMER APPARATUS

BACKGROUND OF THE INVENTION

1. Field of the Invention

The field of invention relates to swimming pool cleaning apparatus, and more particularly pertains to a new and improved swimming pool skimmer apparatus wherein the same is arranged to include fluid flow from and in association with the outlet of a swimming pool pump to direct fluid flow into a skimmer.

2. Description of the Prior Art

Swimming pool cleaning apparatus of various types have been utilized throughout the prior art and exemplified in U.S. Pat. No. 4,889,622 wherein a basket member in cooperation with a suction member is arranged to clean debris from the top surface of a swimming pool.

U.S. Pat. Nos. 5,043,060; 4,518,495; 3,856,679; and 4,606,819 are further examples of swimming pool cleaning and skimmer structure.

The instant invention attempts to overcome deficiencies of the prior art by providing for a compact and readily retrofitted swimming pool cleaning apparatus relative to a swimming pool and in this respect, the present invention substantially fulfills this need.

SUMMARY OF THE INVENTION

In view of the foregoing disadvantages inherent in the known types of swimming pool cleaning apparatus now present in the prior art, the present invention provides a swimming pool skimmer apparatus wherein the same employs a basket member to receive debris from a circular flow within an associated swimming pool. As such, the general purpose of the present invention, which will be described subsequently in greater detail, is to provide a new and improved swimming pool skimmer apparatus which has all the advantages of the prior art swimming pool skimmer apparatus and none of the disadvantages.

To attain this, the present invention provides an apparatus including valving structure to direct in a circular swimming pool a first conduit to effect a circular stream within the swimming pool, with a second conduit directed to a basket, and the second conduit having a nozzle directing fluid flow into the basket in association with the first conduit to direct debris from the swimming pool into the basket structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved swimming pool skimmer apparatus which has all the advantages of the prior art swimming pool skimmer apparatus and none of the disadvantages.

It is another object of the present invention to provide a new and improved swimming pool skimmer apparatus which may be easily and efficiently manufactured and marketed.

It is a further object of the present invention to provide a new and improved swimming pool skimmer apparatus which is of a durable and reliable construction.

An even further object of the present invention is to provide a new and improved swimming pool skimmer apparatus which is susceptible of a low cost of manufacture with regard to both materials and labor, and which accordingly is then susceptible of low prices of sale to the consuming public, thereby making such swimming pool skimmer apparatus economically available to the buying public.

Still yet another object of the present invention is to provide a new and improved swimming pool skimmer apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art swimming pool skimmer structure in cooperation with a vacuum structure, as indicated in U.S. Pat. No. 4,889,622.

FIG. 2 is an isometric illustration of the instant invention.

FIG. 3 is an isometric illustration of the basket structure of the invention.

FIG. 4 is an orthographic view, taken along the lines 4—4 of FIG. 3 in the direction indicated by the arrows.

FIG. 5 is an isometric illustration of the directional conduits of the invention.

FIG. 6 is an orthographic view, taken along the lines 6—6 of FIG. 5 in the direction indicated by the arrows.

DESCRIPTION OF THE PREFERRED EMBODIMENT

Figure 7:
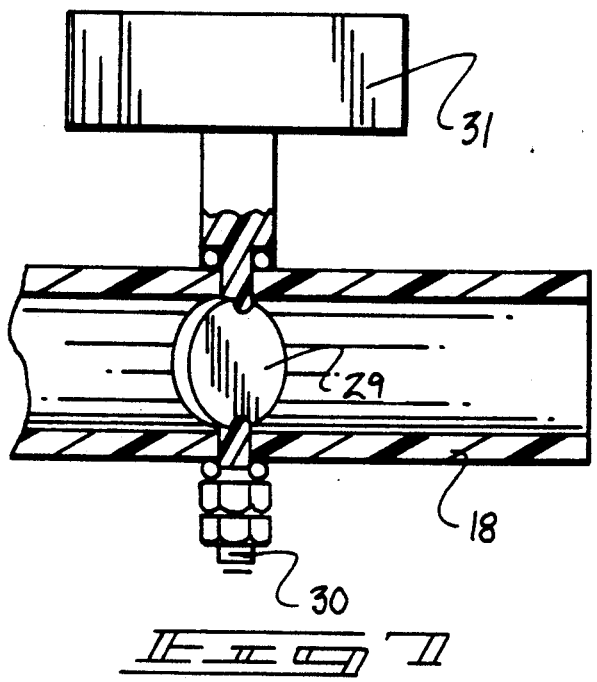
FIG. 7 is an orthographic view, taken along the lines 7—7 of FIG. 5 in the direction indicated by the arrows.

With reference now to the drawings, and in particular to FIGS. 1 to 8 thereof, a new and improved swimming pool skimmer apparatus embodying the principles and concepts of the present invention and generally designated by the reference numeral 10 will be described.

Figure 8:
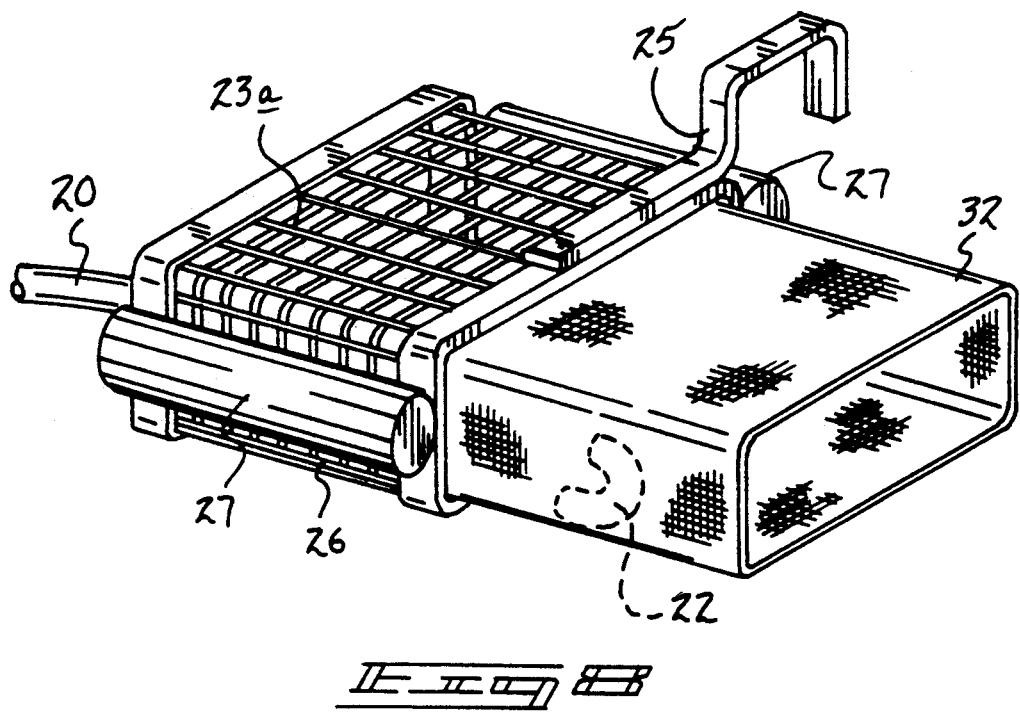
FIG. 8 is an isometric illustration of the invention employing a flexible mesh insert relative to the basket structure of the invention.

More specifically, the swimming pool skimmer apparatus 10 of the instant invention essentially comprises a swimming pool 11, typically of a generally cylindrical configuration, having a cylindrical side wall 12, with a pump 13 in fluid communication with filter 14, wherein an inlet conduit 15 directed from the swimming pool into the pump 13 directs the water through the pump in the filter 13 and 14 respectively and through a filter outlet conduit 16 to return into the swimming pool, wherein the invention further includes a directional conduit 17 from the filter outlet conduit 16, and the directional conduit 17 intersects respective first and second conduits 18 and 19 directed in opposed orientations relative to one another, as the first and second conduits 18 and 19 typically form a T-shaped intersection with the directional conduit 17. A circumferential hose 20 is directed from the second conduit 19 about the interior surface of the swimming pool side wall 12 to a basket conduit 21, that in turn is mounted to a conduit nozzle 22 of a generally U-shaped configuration. The nozzle 22 is arranged for pivotal mounting relative to the basket conduit 21 for ease of access within the basket upon rotation into spaced orientation of the nozzle 22 from the orientation, as indicated in FIG. 3, to a displaced orientation, as indicated in FIG. 8 for example. A basket member 23 is provided, with the basket member entrance opening 24 positioned in a facing relationship relative to the nozzle 22, wherein the nozzle is in the operative configuration, as indicated in the FIG. 3. The basket member includes basket member mesh side walls 26, each having a float tube 27 directed coextensively therealong, wherein the float tubes 27 are arranged in a parallel coextensive relationship relative to one another for floatatingly positioning the basket member onto the surface of the water within a swimming pool. A support bracket 25 mounted to the basket member extends in a U-shaped end portion for fitting relative to the swimming pool side wall 12.

Reference to FIGS. 5 and 6 indicates the use of a valve plate 29 rotatably mounted within the first conduit 18, with a control rod 30 fixedly mounted to the valve plate, with the control rod 30 extending beyond the first conduit 18 terminating in a control rod handle 31 for ease of rotation of the control rod controlling fluid flow through the first conduit 18. Control of the fluid flow through the first conduit is afforded to permit selective circulatory force of the fluid directed from the first conduit in a generally counter-clockwise manner to direct debris into the basket entrance opening 24.

The FIG. 8 indicates the use of a flexible mesh insert 32, wherein the insert 32 is arranged for coextensive mounting within the basket member 23 permitting ease of removal of the insert 32. It should be noted that the mesh basket 23 is arranged to receive in an abutting relationship the insert 32 to the basket rear wall 23a providing for confined positioning of the insert within the basket member.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A swimming pool skimmer apparatus in combination with a swimming pool, wherein the swimming pool includes a swimming pool side wall and a pump member, and an outlet conduit directed in fluid communication from the pump member and mounted to a directional conduit from the pump member in fluid communication with the conduit member, the direction conduit including a first conduit and a second conduit, with the first conduit and second conduit arranged in a coaxially aligned relationship relative to one another in adjacency to an interior surface of the side wall, and a circumferential hose directed from the second conduit along the interior surface of the side wall, and a basket member, the basket member including a basket conduit in fluid communication with the circumferential hose, and the basket member having an entrance opening and a nozzle in fluid communication with the basket consuit nozzle arranged in a facing relationship relative to the entrance opening to direct fluid through the basket member from the nozzle to collect debris within the basket member, wherein the first conduit includes a valve plate rotatably mounted therewithin, the valve plate including a control rod fixedly mounted to the valve plate, the control rod projecting exteriorly of the first conduit and terminating in a handle exteriorly of the first conduit for selective rotation of the valve plate within the first conduit to control fluid flow through the first conduit.

2. An apparatus as set forth in claim 1 wherein the basket member includes basket member side walls and a basket member rear wall, the basket member side walls each include a flow tube, and each flow tube arrange in coextensive parallel relationship relative to one another, and the basket member further including a basket member bracket fixedly mounted to the basket member extending laterally beyond the basket member and arranged for securement to the swimming pool side wall.

3. An apparatus as set forth in claim 2 including a flexible mesh insert removably mounted within the basket member, wherein the nozzle is arranged for rotative mounting relative to the basket conduit to permit displacement of the nozzle relative to the basket member and the basket member entrance opening for ease of removal of the insert relative to the basket member.

* * * * *